United States Patent
Mathew et al.

(10) Patent No.: US 11,494,441 B2
(45) Date of Patent: Nov. 8, 2022

(54) MODULAR ATTRIBUTE-BASED MULTI-MODAL MATCHING OF DATA

(71) Applicant: ACCENTURE GLOBAL SOLUTIONS LIMITED, Dublin (IE)

(72) Inventors: Ditty Mathew, Vaikom (IN); Colin Connors, Campbell, CA (US); Tapia Emmanuel Munguia, San Jose, CA (US); Chinnappa Guggilla, Bangalore (IN); Anwitha Paruchuri, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 211 days.

(21) Appl. No.: 16/984,984

(22) Filed: Aug. 4, 2020

(65) Prior Publication Data
US 2022/0043864 A1 Feb. 10, 2022

(51) Int. Cl.
*G06F 16/903* (2019.01)
*G06F 16/2458* (2019.01)
*G06N 20/00* (2019.01)

(52) U.S. Cl.
CPC .... *G06F 16/90335* (2019.01); *G06F 16/2465* (2019.01); *G06N 20/00* (2019.01)

(58) Field of Classification Search
CPC .......... G06F 16/90335; G06F 16/2465; G06F 16/24578; G06F 40/205; G06F 16/338; G06F 3/04842; G06F 16/90332; G06N 20/00; G06N 5/02; G06N 5/00
See application file for complete search history.

(56) References Cited

U.S. PATENT DOCUMENTS

| | | | |
|---|---|---|---|
| 5,870,768 | A | 2/1999 | Hekmatpour |
| 7,720,791 | B2 | 5/2010 | Hyder et al. |
| 8,346,569 | B2 | 1/2013 | Schneiderman et al. |
| 8,433,713 | B2 | 4/2013 | Chen et al. |
| 2001/0042000 | A1 | 11/2001 | DeFoor, Jr. |
| 2005/0216295 | A1 | 9/2005 | Abrahamsohn |
| 2006/0074910 | A1* | 4/2006 | Yun ..................... G06F 16/9535 707/694 |
| 2010/0082607 | A1* | 4/2010 | Punera .................. G06F 16/358 707/723 |

(Continued)

FOREIGN PATENT DOCUMENTS

EP 0774722 5/1997

*Primary Examiner* — Yuk Ting Choi
(74) *Attorney, Agent, or Firm* — Mannava & Kang, P.C.

(57) ABSTRACT

A attribute-based data matching system determines top matches for a first element from a plurality of second elements. The data matching system extracts attributes for the first element from first dataset and attributes for the plurality of second elements from a plurality of second datasets. Pairs of attributes are generated wherein each attribute pair includes an attribute of the first element and an attribute of one of the plurality of second elements. Pairwise rankings of the plurality of second elements corresponding to the attributes of the first element are generated based on weights of the attribute pairs. The pairwise rankings of the attribute pairs are aggregated to determine a ranked list that orders the plurality of second elements based on the extent of their match with the first element. User feedback to the ranked list can be collected and used to adjust the data matching system.

20 Claims, 12 Drawing Sheets

(56) References Cited

U.S. PATENT DOCUMENTS

| | | | |
|---|---|---|---|
| 2012/0143802 A1* | 6/2012 | Balakrishnan | G06Q 30/0203 |
| | | | 706/14 |
| 2014/0122355 A1 | 5/2014 | Hardtke et al. | |
| 2017/0063740 A1* | 3/2017 | Schissel | H04L 51/32 |
| | | | 707/694 |
| 2017/0132866 A1* | 5/2017 | Kuklinski | G06K 9/626 |
| | | | 707/694 |
| 2018/0024901 A1* | 1/2018 | Tankersley | G06T 11/206 |
| | | | 707/694 |
| 2018/0075104 A1* | 3/2018 | Oberbreckling | G06F 16/2456 |
| | | | 707/694 |
| 2018/0075115 A1* | 3/2018 | Murray | G06F 16/248 |
| | | | 707/694 |
| 2022/0050848 A1* | 2/2022 | Panda | G06F 16/285 |
| | | | 707/694 |

* cited by examiner

| ATTRIBUTE INFERENCE TYPE | ATTRIBUTE NAME | DISTANCE METRIC | TYPE | WEIGHT |
|---|---|---|---|---|
| RAW | COMPLETE DOCUMENT | COSINE SIMILARITY | STRING | w1 |
| RULE BASED | YEARS OF EXPERIENCE | MANHATTAN | FLOAT | w2 |
| MACHINE LEARNED (SECTION SEGMENTATION MODULE - INFORMATION EXTRACTION) | EDUCATION SECTION | COSINE SIMILARITY | STRING | w3 |
| MACHINE LEARNED (SECTION SEGMENTATION MODULE - INFORMATION EXTRACTION) | WORK EXPERIENCE BODY | COSINE SIMILARITY | STRING | w4 |
| MACHINE LEARNED (SECTION SEGMENTATION MODULE - INFORMATION EXTRACTION) | SKILLS BODY | COSINE SIMILARITY | STRING | w5 |
| MACHINE LEARNED (LEVEL CLASSIFICATION MODEL) | LEVEL | MANHATTAN | INTEGER | w6 |
| MACHINE LEARNED (INDUSTRY CLASSIFICATION MODEL) | INDUSTRY | MANHATTAN | STRING | w7 |
| COMPLEX | LOCATION | LAT, LONG | FLOAT | w8 |
| COMPLEX | PERSONALITY ATTRIBUTES | MANHATTAN | FLOAT | w9 |
| ………. | ………. | ………. | ………. | ………. |

*FIG. 10*

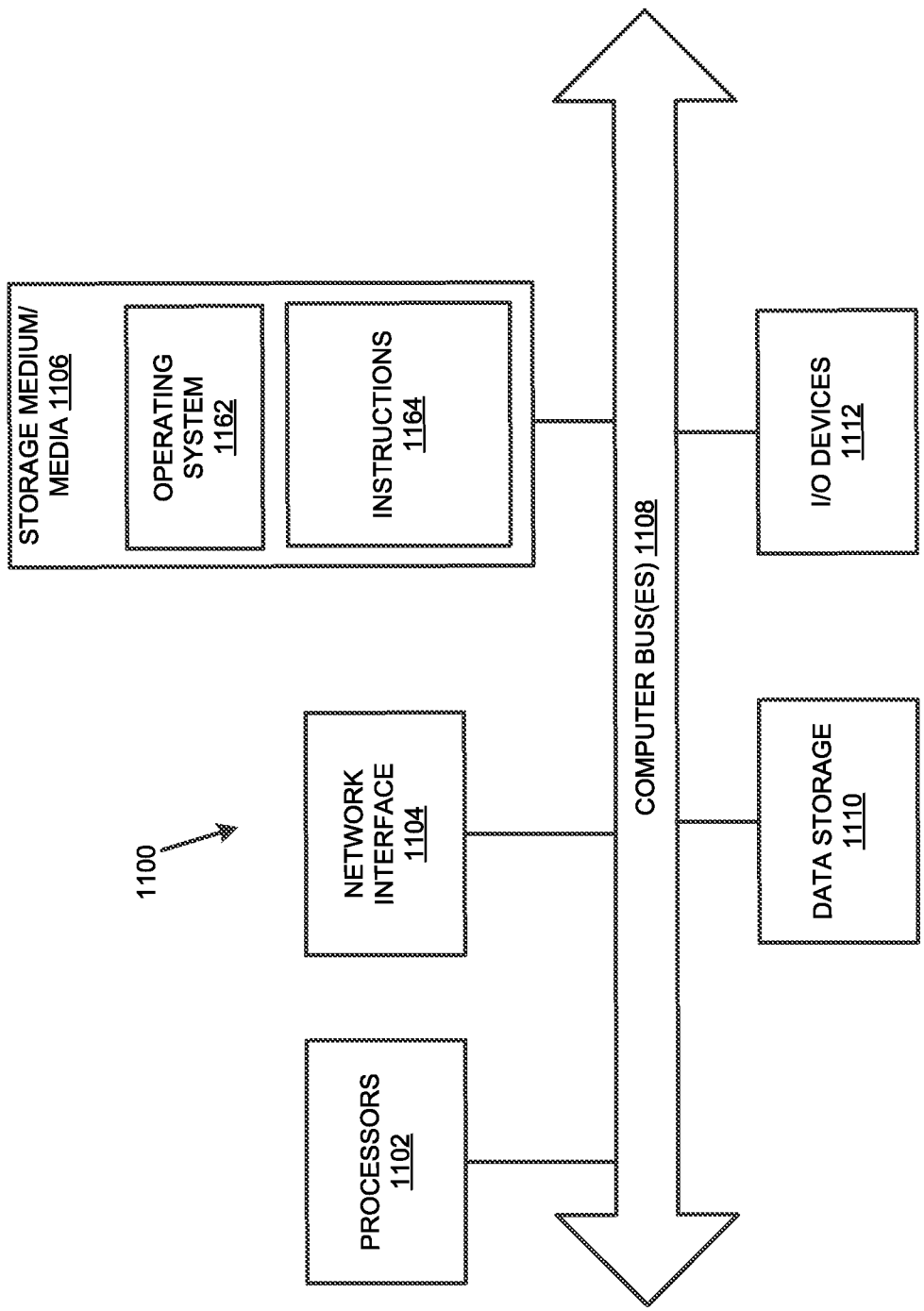

MODULAR ATTRIBUTE-BASED MULTI-MODAL MATCHING OF DATA

BACKGROUND

Data matching involves comparing records pertaining to one element against other records associated with the same element or other elements to determine an extent of match between the records. In an example, data matching can be employed to identify duplicate records in computerized datasets. However, other data matching processes can determine the relevance of different elements to each other. For example, matching search results to a search query and determining an extent of match of the search results so that the most relevant results are presented in response to the search query can involve data matching methods. Data matching processes are widely used in research in various domains including applied statistics, health informatics, data mining, machine learning (ML), artificial intelligence (AI), database management, etc.

BRIEF DESCRIPTION OF DRAWINGS

Features of the present disclosure are illustrated by way of examples shown in the following figures. In the following figures, like numerals indicate like elements, in which:

FIG. 10 shows an attributes table including certain examples of attributes that can be extracted for the recruitment domain.

FIG. 11 illustrates a computer system that may be used to implement the attribute-based data matching system in accordance with the examples disclosed herein.

DETAILED DESCRIPTION

Figure 1:
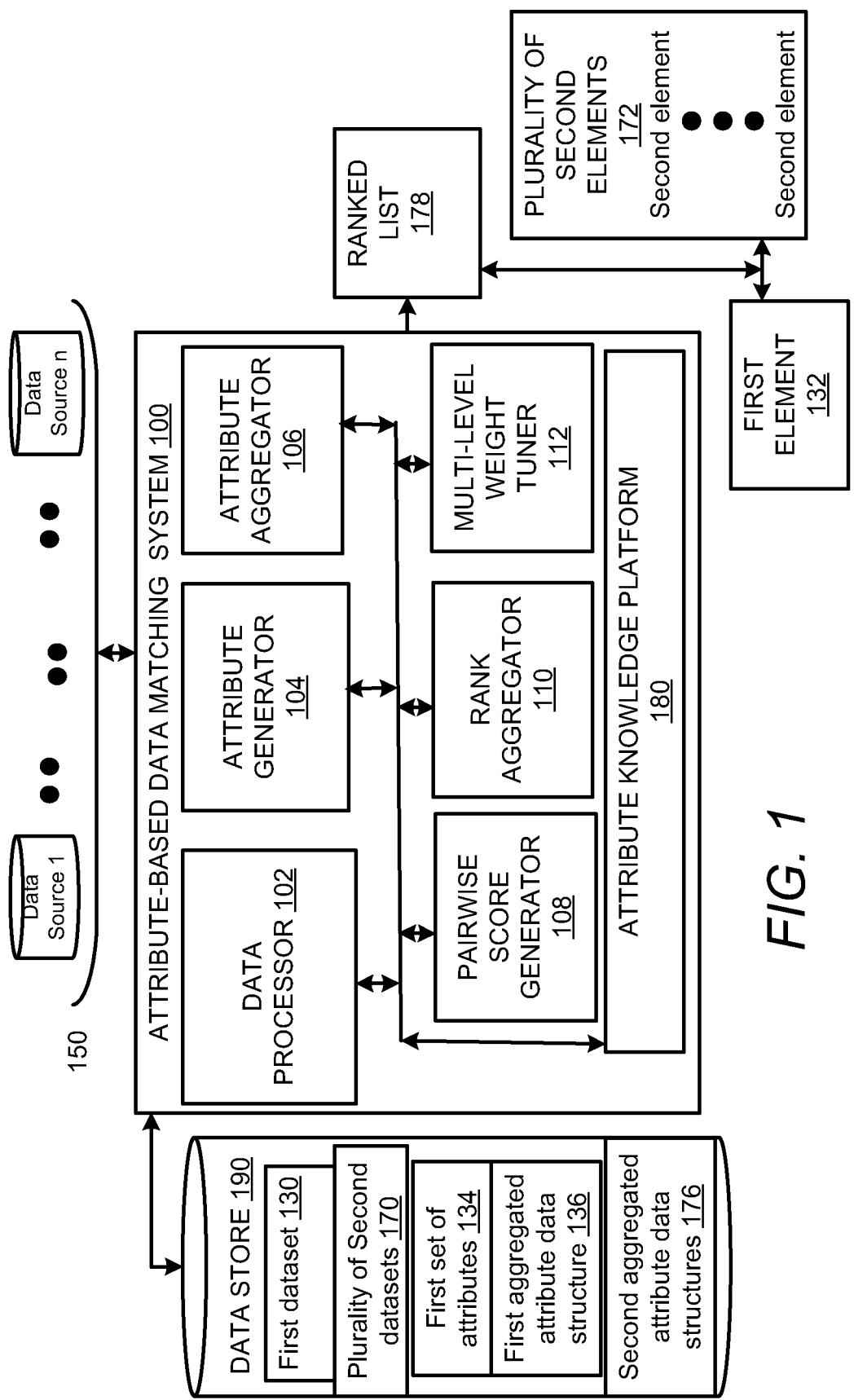
FIG. 1 shows a block diagram of an attribute-based data matching system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the ter "including" means including but not limited to. The term "based on" means based at least in part on.

An attribute-based data matching system that determines matches or relevance between elements based on datasets associated with the elements is disclosed. More particularly, the data matching system can determine the extent of match or relevance between a first element and a plurality of second elements and output the extent of matching as a ranked list of top k second elements that best match or are most relevant to the first element. The data matching system accesses a plurality of data sources and extracts informational items from the plurality of data sources using various methods including, receiving data from a user and employing the user-provided data to conduct a search of the plurality of data sources. The informational items can be received in different formats. Hence, the data matching system converts the informational items into a common or standard format e.g., plain text format. The informational items can be further preprocessed by parsing and tokenization to build a first dataset related to a first element. Similarly, a plurality of second datasets can be built for the plurality of second items via collecting the informational items for the plurality of second items from the plurality of data sources.

Attributes including a first set of attributes and a plurality of second sets of attributes are generated for the first element and each of the plurality of second elements correspondingly from data items in the first dataset and each of the plurality of second datasets. Different types of attributes including raw attributes, rule-based attributes, classification-based attributes, Information Extraction (IE)-based attributes and complex attributes are extracted via application of different models which not only include ML-based models but also deep learning-based models. Each extracted attribute can have an attribute name and three properties associated with it. The three attribute properties include a distance metric, an attribute type, and a weight property. The weight property of the attribute is set based on weight associated with a data source from which the attribute is obtained and the weight associated with the attribute itself. In an example, the weights can indicate the importance and/or authenticity of the data source and the importance of the attribute to the first/second element. The attribute type and the distance metric depend on the data type of the attribute. Aggregated attribute data structures, one for the first element and multiple aggregated data structures with one aggregated data structure for each of the plurality of second elements are generated by concatenating the corresponding attributes.

Pairs of attributes are generated by including or mapping an attribute of the first element with an attribute from a second set of attributes from the plurality of second sets of attributes. In an example, the system can be preconfigured to generate only certain combinations of attributes from the first dataset and the plurality of second sets of attributes based, for example, on predetermined mappings. Weights are computed for each of the attribute pairs and pairwise ranks are generated for each of the plurality of second elements based on total weights of the attribute pairs associated with the corresponding second element over each of the different attribute inference types. The pairwise rankings are therefore generated for the second element with respect to each of the raw attributes, the rule-based attributes, the classification-based attributes, the IE-based attributes and the complex attributes.

The pairwise rankings thus generated for the different second elements are aggregated and compared to produce a ranked list of top k second elements that form the best matches or are most relevant to the first element from the plurality of second elements. The pairwise rankings are aggregated differently based on the detection of partial rankings within the pairwise rankings. A partial ranking can be detected if there is no corresponding attribute from the first set of attributes for an attribute from one of the plurality of second sets or vice versa. When a partial ranking is not detected, the pairwise rankings can be aggregated via score-based aggregation methods. When a partial ranking is detected, the pairwise rankings can be aggregated via an index-based aggregation method. Based on the aggregated ranks, the ranked list of top k second elements (wherein k is a natural number) that best match the first element from the plurality of second elements is generated. In an example, the user feedback to the ranked list is received in which the user may supply a modified ranked list which is different from the ranked list produced by the system. A dissimilarity metric can be calculated between the modified ranked list and the ranked list. The weights associated with the attributes can be modified based on the dissimilarity metric thereby improving the system based on the ground truth values received in the user feedback.

The attribute-based data matching system disclosed herein provides for an improvement in data matching systems that search out and identify relevant information for a given piece of data. For example, search systems are generally based on keywords wherein a keyword entered by a user is employed to identify the relevant results. However, if a keyword is erroneous or if one or more keywords are missing then the results returned may be inaccurate. Instead of or in addition to keyword-based searches, the attribute-based data matching system provides for attribute-based searches with different levels of complexities that not only use the keywords but also use rule-based inferences, ML-based inferences, and deep learning-based models. The various models thus trained in extracting attributes can be used across different domains when stored as a library of attributes in a knowledge platform. Furthermore, multiple attribute pairs with multi-level weights at the data source level, attribute level, etc. based on different distance metrics are meaningfully combined. The attribute-based data matching system further compensates for missing data by enabling aggregation based on partial ranking so that attributes that are not matched up to the corresponding attributes of the element being matched are not completely disregarded from consideration thereby preventing biasing of data and providing optimal matches. Furthermore, the attribute-based data matching system provides for a generic matching methodology that is applicable across domains as it is independent of the number, type and complexity of the attributes used and the sources of the attributes (i.e., regardless of whether the attributes are extracted from the job description, resume, transcripts, etc.). The standard module attribute based structure implemented by the attribute-based data matching system enables its easy integration into any new inference module either based on new deep learning models or simple rules that are incorporated into the matching methodology. As a result, new information extraction approaches etc., can be easily incorporated into the matching methodology.

FIG. 1 shows a block diagram of the attribute-based data matching system 100 in accordance with the examples disclosed herein. The data matching system 100 provides for an improved dataset matching methodology by enabling an attribute-based search at different levels of complexity as opposed to keyword-based search and wherein partial rankings due to missing information and weights at different levels are considered during the matching processes. The data matching system 100 accesses a first dataset 130 pertaining to a first element 132 and determines the matches for the first element 132 from a plurality of second elements 172 based on a plurality of second datasets 170 that include data corresponding to the plurality of second elements 172. By way of illustration and not limitation, the first element 132 can correspond to a candidate searching for employment while the plurality of second elements 172 can correspond to a plurality of job opportunities for which the data matching system 100 determines a ranked order for the opportunities starting from the highest ranked or the best matching opportunity. It may be appreciated that the domain of recruitment is discussed herein for illustration but the techniques disclosed herein for matching datasets can be applied to any domain wherein matches between two or more elements need to be determined. The data matching methods discussed herein can be equally applied to other domains such as but not limited to, social media domain, healthcare domain, financial domain, etc.

The data matching system 100 includes a data processor 102, an attribute generator 104, an attribute aggregator 106, a pairwise score generator 108, a rank aggregator 110, and a multi-level weight tuner 112. The data processor 102 accesses a plurality of data sources 150 that provide informational items regarding the first element 132 in different formats. Referring to the example of the job candidate or job seeker, the informational items can include but are not limited to, a resume of the candidate, the candidate's social media profile, the candidate's personal website, the candidate's skills, the candidate's geographical location information, results of different tests such as coding tests or other cognitive assessments, a personality assessment, etc., that may have already been administered to the candidate, etc. The informational items can be received as different files having various formats such as word processor or plain text format for documents e.g., the resume, or as markup files and/or images for personal websites or social media profiles or the informational items such as form responses i.e., data collected over online forms or results from programs which administer the different tests which may be received in other proprietary data formats, etc. The data processor 102 is configured to convert such received informational items into text format using techniques such as optical character recognition (OCR), etc. The data processor 102 may further parse, tokenize the data extracted from the informational items to build the first dataset 130. The data matching system 100 may be communicatively coupled to a data store 190 to store data such as the first dataset 130 that is generated and/or used during operations.

The first dataset 130 is accessed by the attribute generator 104 which generates attributes for the first element 132. The attribute generator 104 is configured to generate modular attributes of different levels of complexity ranging from raw attributes such as keywords or other textual constructs to complex attributes such as deep learning inferences form the plurality of data sources 150. Each attribute is characterized by an attribute type, a distance metric, and a weight that accounts for the significance of the data source and the attribute internally within the data matching system 100. The attribute type property is indicative of the data type of the attribute. Accordingly, the attribute type property can take values relating to different data types such as string, integer, float, etc. Furthermore, as the attributes are produced from different data sources, each attribute may have a different distance metric associated with it. Example distance metrics used may include Cosine similarity, Levenshtein Distance metric, Manhattan distance metric, etc. Accordingly, the attribute generator 104 extracts the first set of attributes 134 of different complexities from the first dataset 130 by various inferences as detailed herein. Referring again to the candidate recruitment example, the entire text of the candidate's resume (i.e., one of the informational items of the first element 132) can be stored as an attribute with 'string' as the attribute type, 'Cosine similarity' as the distance metric and the weight being calculated from predetermined weights associated with the data source from which the resume was received and the predetermined weight associated with the resume itself. In an example, the various models used to generate the attributes derived can be stored to an attribute knowledge platform 180 that stores "cartridges" of attributes for different hiring areas and enables the capability to re-use previously trained attributes based on ML attributes as newer elements are processed by the data matching system 100.

The attributes aggregator 106 aggregates or concatenates the first set of attributes 134 into a first aggregated attribute data structure 136. In an example, a data structure such as a HashMap can be generated by the attribute aggregator 106 from the first set of attributes 134. The HashMap stores data as key-value pairs. Therefore, the attributes extracted from the plurality of data sources 150 are retained in a single data structure thereby simplifying the process of matching up the informational items derived from different data sources in various formats pertaining to different items to be matched.

It can be appreciated that just as the informational items regarding the first element 132 are derived from the plurality of data sources 150 and processed to create the first aggregated attribute data structure 136, the informational items regarding each of the plurality of second elements 172 are derived to generate a plurality of second datasets 170. The plurality of second dataset 170 is processed in the same manner as described above to generate a set of second aggregated attribute data structures 176 wherein each second aggregated attribute data structure corresponds to a second element of the plurality of second elements 172. For example, if the first element 132 corresponds to the job candidate then each second aggregated attribute data structure summarizes the attributes of each of the job opportunities which would make up the plurality of second elements 172. Conversely, if the first element 132 corresponds to a job opening or a job opportunity then the plurality of second elements 172 can represent the candidates for the job opportunity.

The first aggregated data structure 136 and the plurality of second aggregated attribute data structures 176 which correspond to the plurality of second elements 172 are provided to a pairwise score generator 108. The pairwise score generator 108 not only generates pairs of attributes by mapping attributes from the first aggregated data structure 136 with the attributes from the second aggregated attribute data structures so that each attribute pair contains an attribute pertaining to the first element 132 and an attribute pertaining to one of the plurality of second element 172. The total weight of each attribute pair is also determined based on the weight property associated with each of the attributes that make up the pair. The plurality of second elements 176 are then sorted based on pairwise rankings that are generated by different scoring methodologies that are applied to the different attributes. Therefore, a subset of top n (wherein n is a natural number) second elements with respect to match with a raw attribute of the first element 132 may be generated. Similarly, the subsets of top n second elements can be generated for each of the attributes in the first set of attributes.

The attribute pairs, the top n second elements with their ranks are then fed to the rank aggregator 110. The rank aggregator 110 further aggregates rank differently for different attribute pairs. In particular, the rank aggregator 110 is configured to apply two ranking methodologies depending on partial ranking detection. Based on the aggregated rank generated for each of the plurality of second elements 172 from different attribute pairs, a ranked list 178 of the top k second elements of the plurality of second elements 172 may be generated with the aggregated ranks indicative of an extent of match between a given second element and the first element so that the best match is placed at the top of the ranked list 178. Therefore, the job candidate is provided with a ranked list of opportunities with the best matching job opportunities at the top of the list.

The ranked list 178 thus generated can be provided to users who may or may not agree with the rankings generated by the system. The feedback or the ground truth values are collected from the users and compared to the rankings by the multi-level weight tuner 112. If the ground truth values differ from the rankings then the multi-level weight tuner 112 can be configured to adjust the weights at different levels, e.g., the data source level, the attribute level, etc. The weights can then be stored to adjust the various models accordingly.

Figure 2:
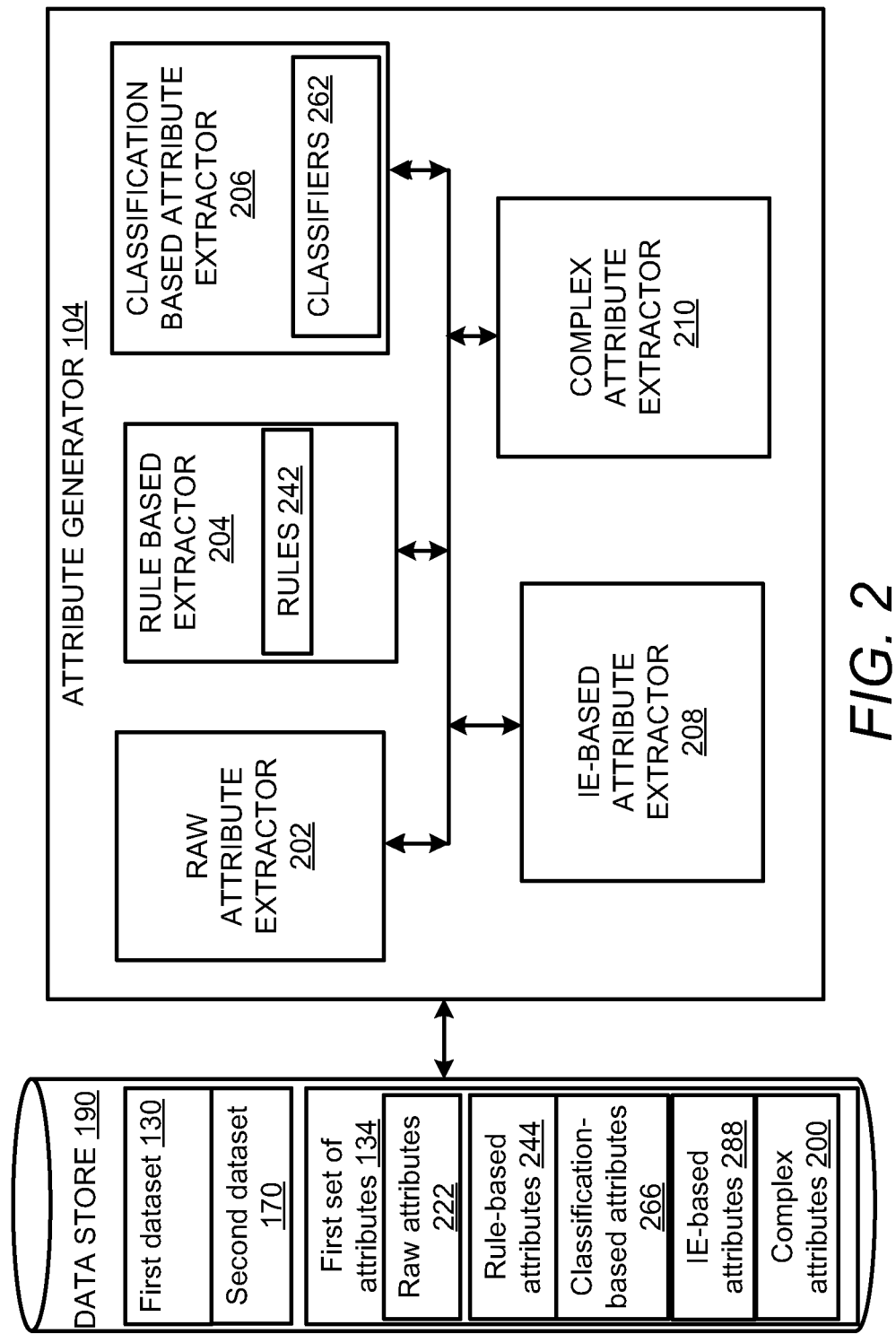
FIG. 2 shows a block diagram of an attribute generator in accordance with the examples disclosed herein.

FIG. 2 shows a block diagram of the attribute generator 104 in accordance with the examples disclosed herein. The attribute generator 104 includes a raw attribute extractor 202, a rule-based attribute extractor 204, a classification-based attribute extractor 206, information extraction (IE) based attribute extractor 208 and complex attribute extractor 210. Each of the different attribute extraction modules can be further configured to set the distance, the attribute type, and calculate the weight properties of each of the extracted attributes as described herein.

The raw attribute extractor 202 extracts the raw text as attributes for the first element 132 from the first dataset 130. The raw attributes 222 can include but are not limited to, keywords, forms, responses, etc. Accordingly, the raw attribute extractor 202 can include text extraction models to identify and extract relevant collections of strings or textual tokens as the raw attributes 222 from the first dataset 130. The raw attribute extractor 202 sets the distance metric for the extracted raw attributes to Cosine similarity and the weight is set based on a predetermined weight associated with the data source from which the raw attribute was extracted. For example, the raw attribute extractor 202 can extract raw attributes such as but not limited to, keywords for skills, educational qualifications, prior employers, etc.

The rule-based attribute extractor 204 extracts attributes based on rules 242. For example, the rule-based attributes 244 of the job seeker can include years of experience, the number of publications, etc. The classification-based attribute extractor 206 can include storing classifiers 262 pertaining to certain domain-specific levels for the extraction of classification-based attributes 266. By way of illustration and not limitation, the classifiers can include, naïve Bayes classifier, maximum entropy models, multinomial logistic regression, etc. For example, the classification-based attributes of the job seeker can include industry-level classification models, skill or non-skilled classification models, etc. The IE-based attribute extractor 208 includes IE models such as but not limited to, recurrent neural networks, Hidden Markov models, conditional random fields, etc., for the extraction of IE-based attributes 288. Again, for the recruitment use case, data such as university name extraction, worker extraction model, location extraction model, etc. can be trained and used to extract the corresponding data from the first dataset 130. The complex attribute extractor 210 includes extraction of complex attributes 200 which can be output received from third-party tools. Referring again to the job seeker example, the complex attributes can include leadership evaluations, personality assessments, etc.

The rule-based attribute extractor 204, the classification-based attribute extractor 206, the IE-based attribute extractor 208 and the complex attribute extractor 210 also set the distance metrics, the attribute types, and the weight properties of the corresponding attributes as described above for the raw attribute extractor 202.

Figure 3:
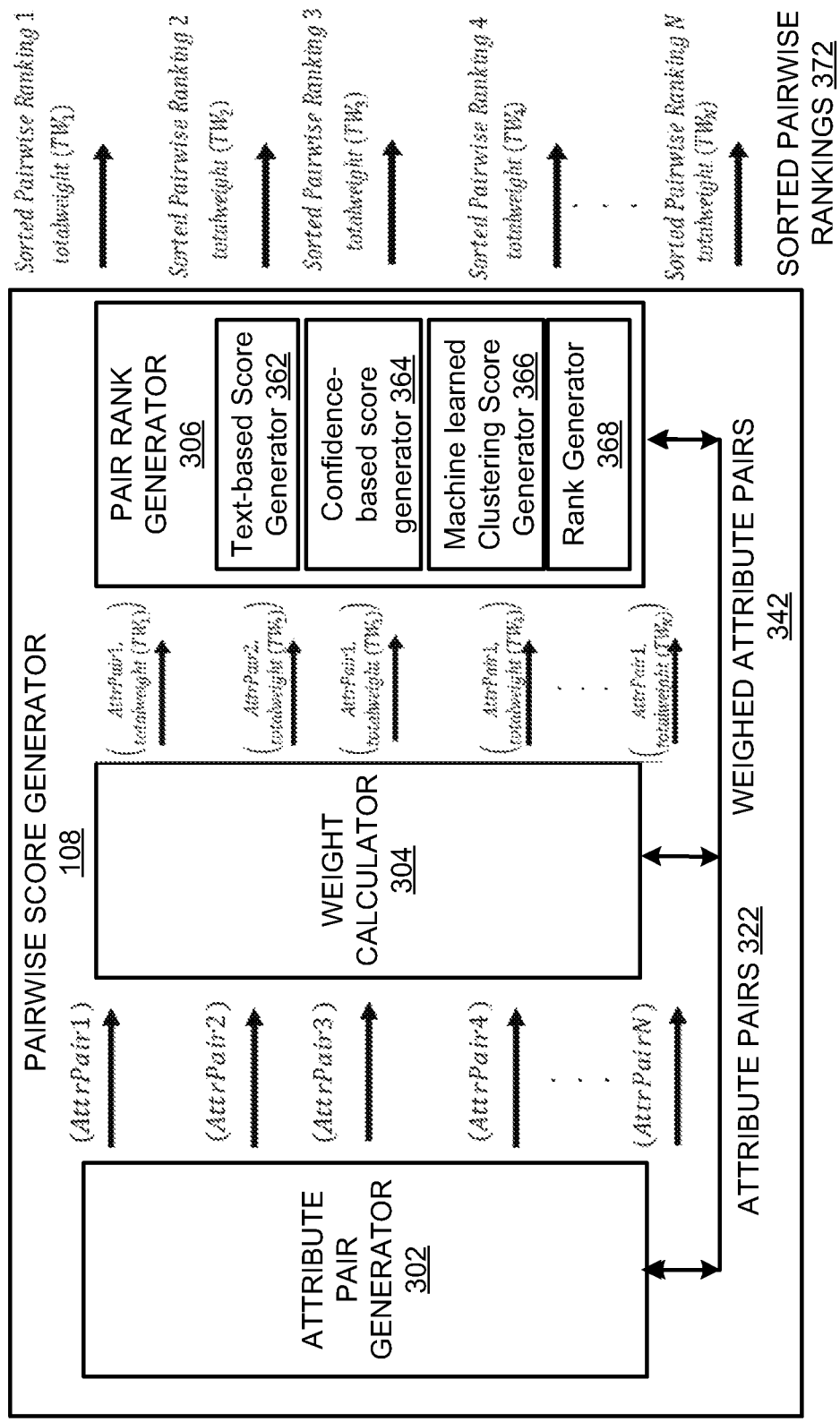
FIG. 3 shows a block diagram of a pairwise score generator in accordance with the examples disclosed herein.

FIG. 3 shows a block diagram of the pairwise score generator 108 in accordance with the examples disclosed herein. The pairwise score generator 108 includes an attribute pair generator 302, a weight calculator 304, and a pair rank generator 306. The attribute pair generator 302 is provided with the first aggregated attribute data structure 136 and the plurality of second aggregated attribute data structures each of which corresponds to a respective second element of the plurality of second elements 172. The attribute pair generator 302 can generate pairs of attributes 322 wherein a pair of attributes can include an attribute from the first aggregated attribute data structure 136 and an attribute from one of the second aggregated attribute data structures. In an example, each attribute from the first aggregated attribute data structure 136 can be paired with each of the attributes of the second aggregated attribute data structure. However, to improve processing efficiency and to reduce noisy pairs, predetermined pairs of attributes with attributes from the first aggregated attribute data structure 136 mapped to specific attributes of the second aggregated attribute data structure can be generated. Based on the domain and the attribute types, the attribute pair generator 302 can be configured to generate specific pairs of attributes. Similarly, attribute pairs mapping the attributes from the first aggregated attribute data structure 136 to specific attributes of each of the plurality of second aggregated attribute data structures are generated by the attribute pair generator 302.

The weight calculator 304 obtains the total weight of each of the attribute pairs based on the weights of attributes and the weights of the data sources from which each attribute of the given attribute pair is extracted. An attribute weight can be predetermined based on a domain or even the nature of the first element 132 or the corresponding second element. In addition, the data sources themselves carry weights so that reliable data sources are given greater weight than less reliable data sources. Referring again to the recruitment domain, wherein an element pertains to a job application and the second element pertains to a job posting, $d_1$ can be the data source of the application, $d_2$ can be the data source of the job posting, $a_1$ is the attribute of the application belonging to the data source $d_1$ and $a_2$ is the attribute of the job posting from the data source $d_2$. The total weight of the attribute pair $(a_1, a_2)$ can be obtained as a product of:

$$\text{Total weight} = w_{d1} \times w_{a1} \times w_{d2} \times w_{a2} \quad \text{Eq. (1)}$$

The weights of the attribute pairs are provided to the pair rank generator 306 which generates a sorted pairwise ranking for each of the plurality of second elements 172 based on the total weights of the attribute pairs. The pairwise rankings of each of the attribute pairs enable obtaining the rank of each of the plurality of second elements 172 that is indicative of their extent of match with the first element 132. Different scoring methodologies can be employed to produce the pairwise rankings of the attribute pairs based on the type of attributes that make up the attribute pair. The pair rank generator 306 can therefore include a text-based score generator 362 that employs text-based scoring techniques such as but not limited to Elastic Search or Bidirectional Encoder Representations from Transformers (BERT) to score attribute pairs such as the raw attributes 222. Attributes such as the raw attributes 222 can be scored and ranked with a rank generator 368 using the text-based score generator 362. Similarly, a confidence-based score generator 364 can employ sorting algorithms on the confidence values associated with the machine-learned attributes. Therefore, machine-learned attributes such as pairs of classification-based attributes 266 or attribute pairs including IE-based attributes 288 can be scored by the confidence-based score generator 364. Example methodologies implemented by the confidence-based score generator 364 can include, sorting algorithms associated with the machine-learned attributes. The rank generator 368 can be configured to compare the scores and rank the attribute pairs. The pair rank generator 306 also includes a machine-learned clustering score generator 366. In an example, complex attribute pairs n be scored by the machine-learned clustering score generator 366. Again, the scores can be compared and the plurality of second elements ranked by the rank generator 368. Therefore, the output of the pairwise score generator 108 includes sorted pairwise rankings 372 of the plurality of second elements 172 based on the total weights obtained from the weight calculator 304.

Figure 4:
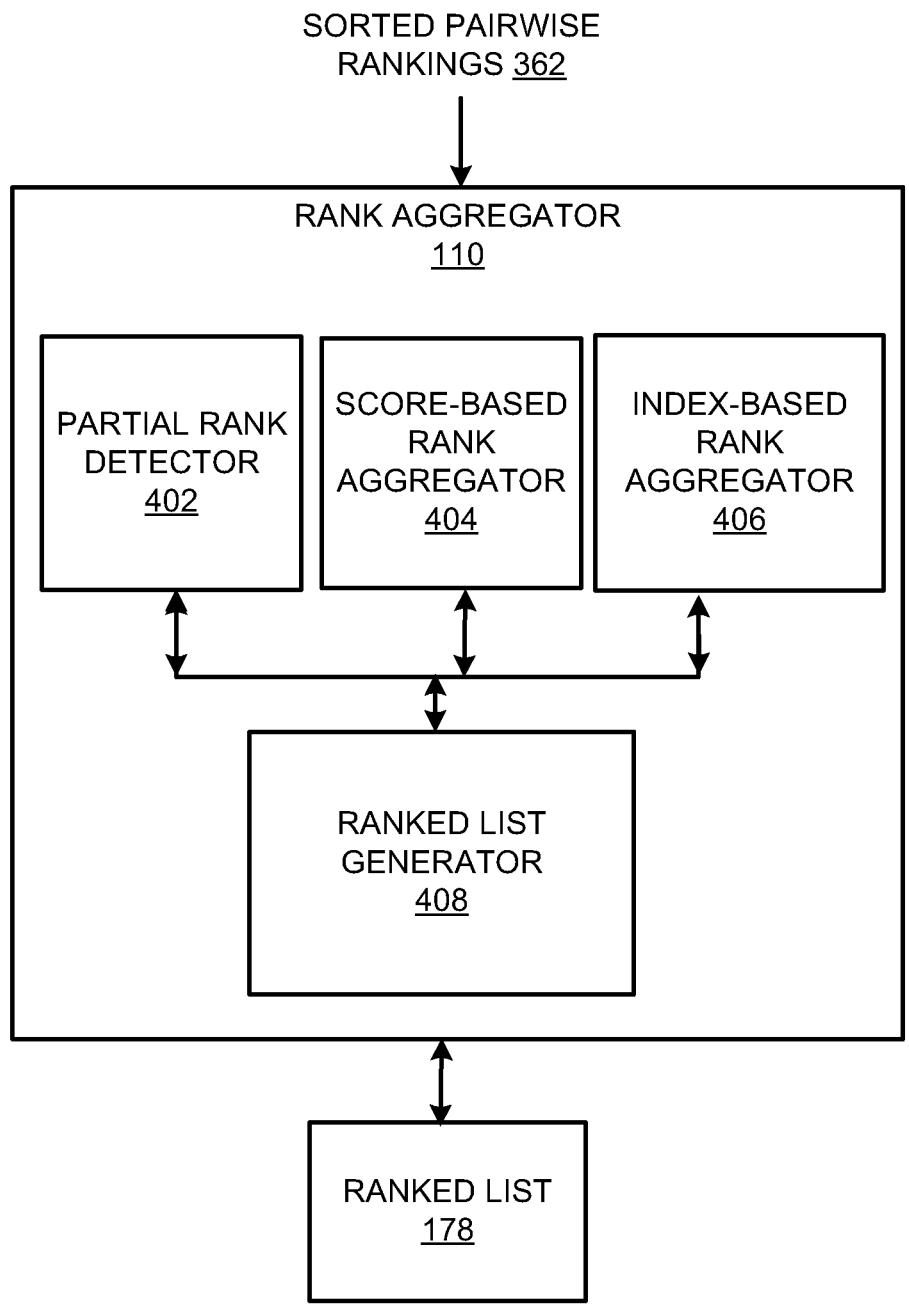
FIG. 4 shows a block diagram of a rank aggregator in accordance with the examples disclosed herein.

FIG. 4 shows a block diagram of the rank aggregator 110 in accordance with the examples disclosed herein. The rank aggregator 110 includes a partial rank detector 402, a score-based rank aggregator 404, an index-based rank aggregator 406, and a ranked list generator 408. The partial rank detector 402 detects attribute pairs with missing information. Referring to the recruitment example, if a job opportunity requires a listing of publications and the applicant's resume does not include any publications then the attribute pair corresponding to publications listing remains incomplete or partial with the job requirement not being fulfilled by the applicant's information. Using simple rank-aggregation methodologies can cause the data to be biased or the applicant to be disadvantaged by eliminating the incomplete attribute from further consideration by setting the score of that particular attribute pair to zero. The partial rank detector 402 processes such incomplete attribute pairs using index-based aggregation methodologies implemented by the index-based rank aggregator 406 while the ranks of the completed attribute pairs can be aggregated by the score-based rank aggregator 404. This is because index-based rank aggregation can be computationally heavy while score-based rank aggregation methods such as but not limited to, Fagin's algorithm, Bayesian Rank Aggregator, Threshold Algorithm, etc. are very fast which can save computation time. The aggregated ranks that are output by the index-based rank aggregator 406 and the score-based rank aggregator 404 are compared by the ranked list generator 408 to identify the top k (wherein k is a natural number) elements from the plurality of second elements 172 that match the first element 132. The ranked list 178 including the top k matching second elements is provided by the ranked list generator 408 as the output of the data matching system 100. When applied to the case of the job seeker, the ranks of the attribute pairs pertaining to each of the plurality of job opportunities are aggregated and compared and the ranked list 178 including the top k matching job opportunities is provided by the data matching system 100.

Figure 5:
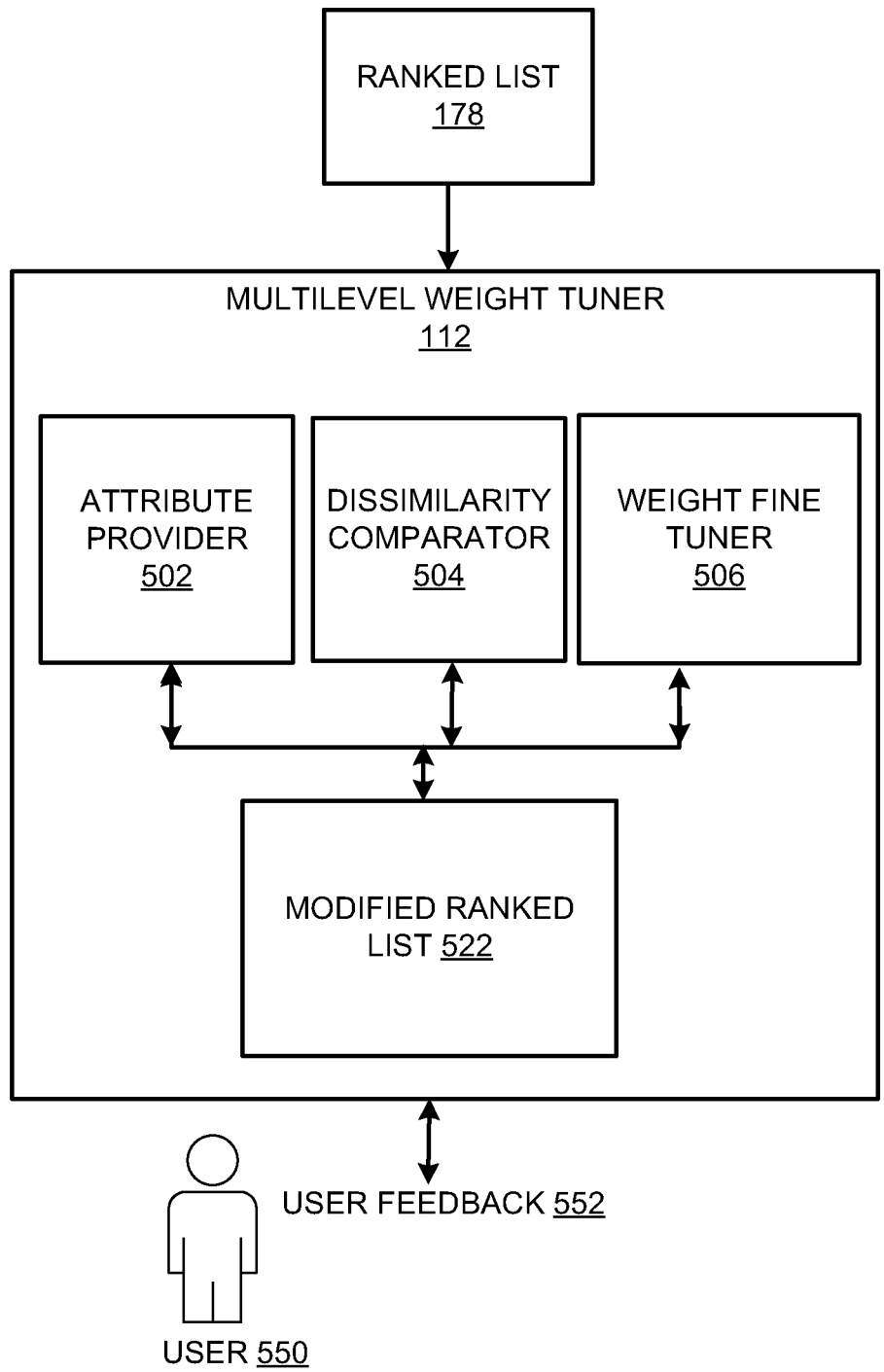
FIG. 5 shows a block diagram of a multi-level weight tuner in accordance with the examples disclosed herein.

FIG. 5 shows a block diagram of the multi-level weight tuner 112 in accordance with the examples disclosed herein. An attribute provider 502 provides the various attributes and the weights associated with the attributes to a user 550 for review. In an example, the user 550 can provide user feedback 552 to adjust one or more weights for one or more of the attributes. Upon receiving the user feedback 552, a modified rank list 522 can be produced based on the user's adjusted weights. The system, therefore, employs the user's weights to obtain weights of the attribute pairs and rank the attribute pairs to generate the modified rank list 522. A dissimilarity comparator 504 compares the ranked list 178 and the modified ranked list 522 to evaluate a dissimilarity metric between the two ranked lists. A weight fine tuner 506 uses the dissimilarity metric to recalculate the weights of the attributes in the attribute extraction models stored on the attribute knowledge platform 180. Therefore, the data matching system 100 is built to be responsive to the changes in the domain and evolves with such changes to maintain its relevance.

Figure 6:
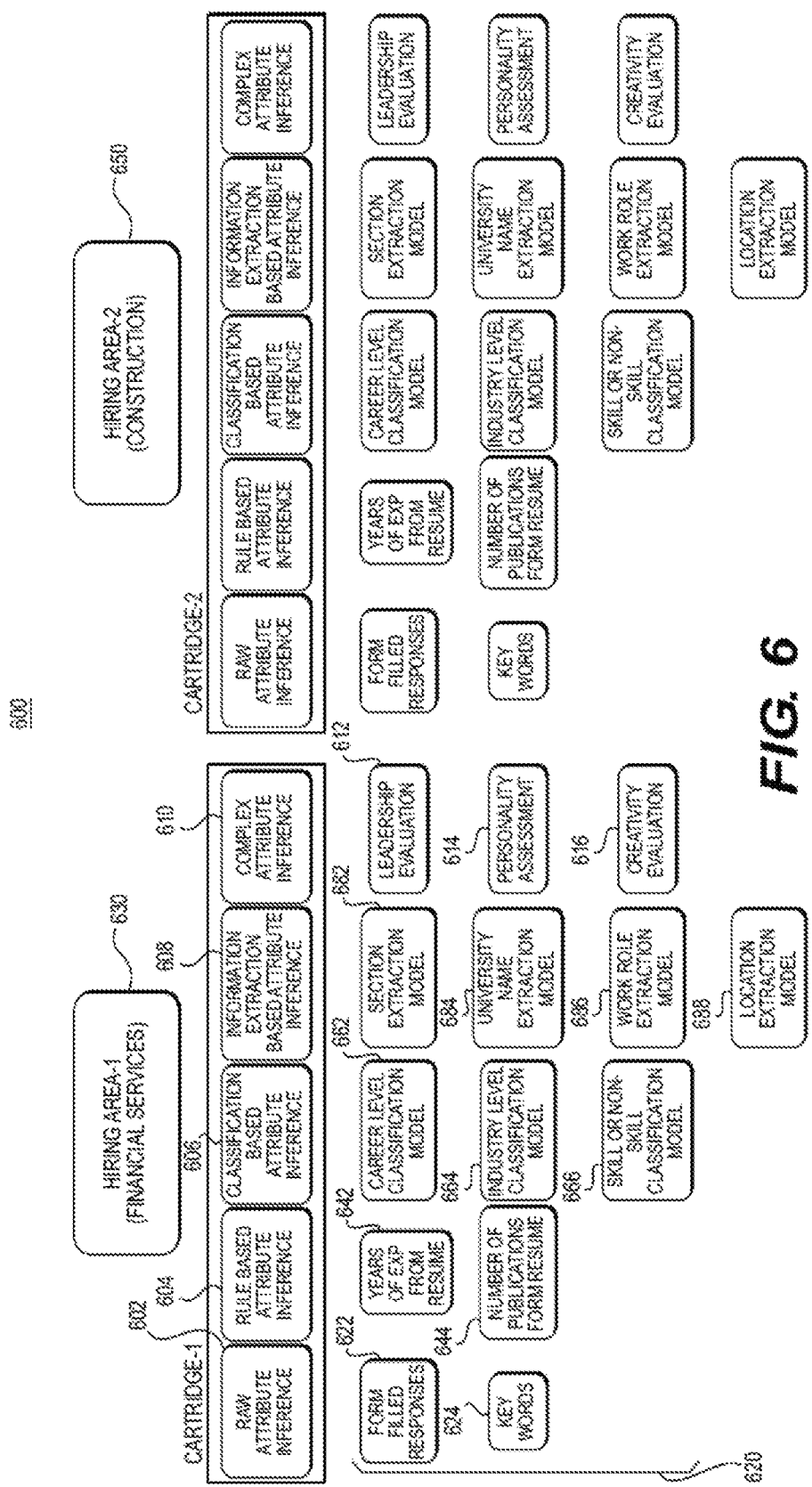
FIG. 6 shows a block diagram of an example knowledge platform built in accordance with the examples disclosed herein.

FIG. 6 shows a block diagram of an example of a knowledge platform 600. The data matching system 100 can be configured to match elements of different domains and one example domain being discussed herein is the recruitment domain. Accordingly, the example knowledge platform 600 stores the various attribute extraction models 620 pertaining to the recruitment domain which may be implemented by the attribute generator 104. The attribute extraction models can be stored as reusable cartridges which one trained for a particular domain/sub-domain, can be reused for different elements within the same domain/sub-domain. By way of illustration and not limitation, two sub-domains including the financial services field 630 and construction 650 are shown. The raw attribute inferencing models 602 can include models for extraction of form fill responses 622 and keywords 624. The rule-based attribute inferencing models 604 which can be implemented by the rule-based extractor 204 can include models for extracting years of experience from resume 642 and the number of publications from the resume 644. The classification-based attribute inference models 606 include models for career level classification models 662 such as models to classify a candidate as a clerk, supervisor, officer, manager, executive, etc., industry level classification model 664 and skill or non-skill classification models 666. The information extraction models 608 can include section extraction models 682 (i.e., models that extraction sections of a resume, etc.), university name extraction models 684, work role extraction models 686 and location extraction models 688. The complex attribute inference models 610 can include models for leadership evaluation 612, personality assessment, 614, creativity evaluation 616, etc. Although similar models are shown under the construction sub-domain 650, it can be appreciated that this is not necessary and that there may be certain similar or dissimilar domain-specific models for different sub-domains or hiring areas. Depending on the hiring area, the different cartridges may be selected.

Figure 7A:
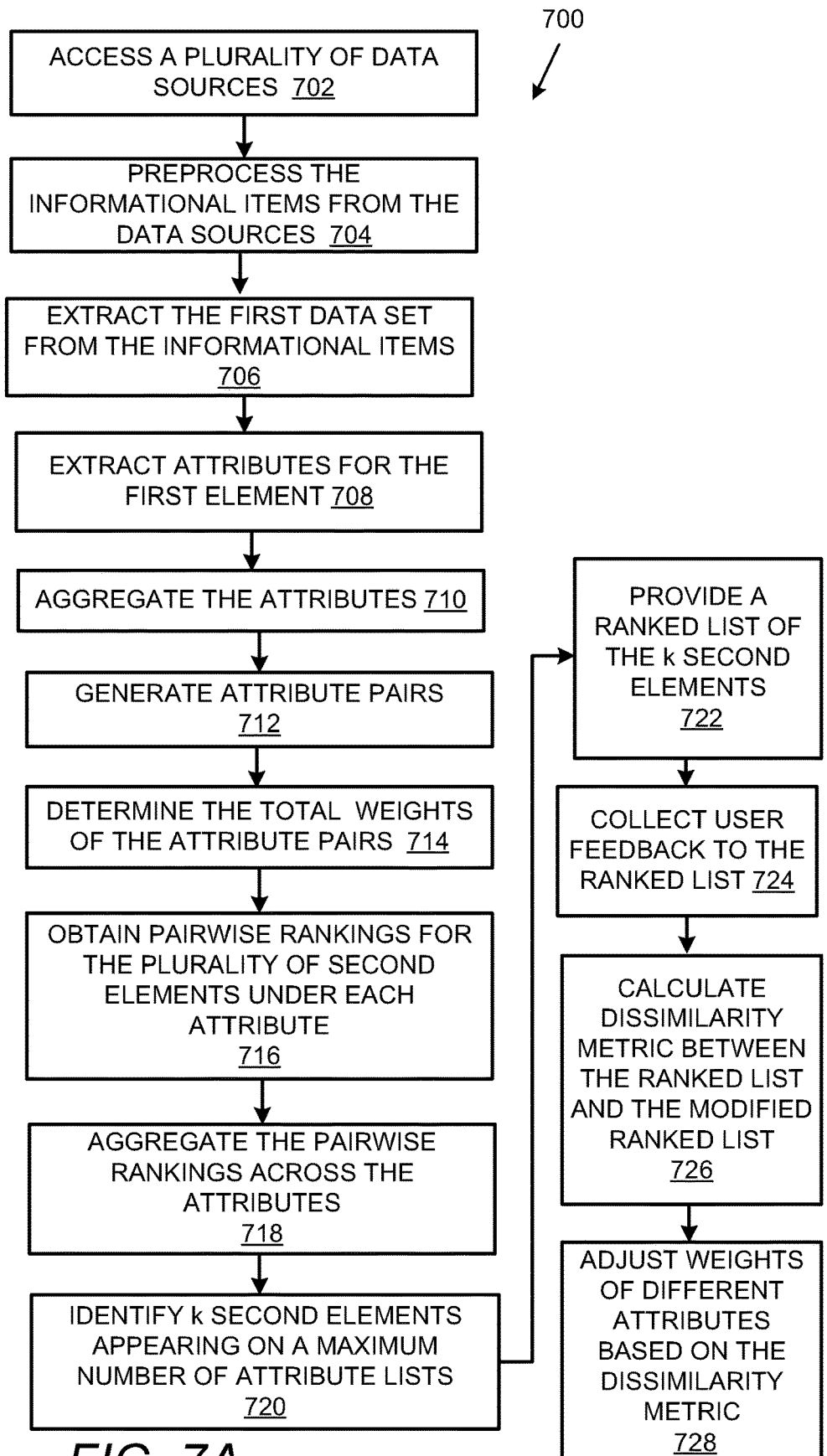
FIG. 7A shows a flowchart that details a method of matching elements in accordance with examples disclosed herein.

FIG. 7A shows a flowchart 700 that details a method of matching elements in accordance with examples disclosed herein. The method begins at 702 wherein the plurality of data sources 150 that provide informational items regarding the first element 132 in different formats are accessed. In an example, the data matching system 100 can be preconfigured to access certain data sources such as social networking websites, etc., while some data sources such as specific documents (e.g., resumes) can be explicitly provided to the data matching system 100 via email, for file uploads, etc., for the extraction of the informational items that make up the first dataset 130. As the informational items are received as files of different file formats, the informational items are initially preprocessed at 704 for conversion to a common format such as a plain text format for further processing. The first dataset 130 is extracted from the informational items at 706. Techniques such as parsing, tokenizing, string-matching, usage of regular expressions, or even natural language processing (NLP) methods, can be employed to extract the first dataset 130. The various attributes including the raw attributes 222, the rule-based attributes 244, the classification-based attributes 266, the IE-based attributes 288, and the complex attributes 200 for the first element 132 are extracted at 708 from the first dataset 130. Various trained models stored in the attribute knowledge platform 180 can be employed to extract the attributes. Extraction of attributes at 708 also includes setting the different properties of the attributes. Accordingly, the distance metric property, the weight property of the attribute, and the attribute type are set at 708 for each extracted attribute. The weight property of each attribute not only depends on the weight of the data source from which the attribute is extracted but also based on the weight of the attribute itself. For example, in the case of the job seeker, a skill attribute can carry greater weight as opposed to a location attribute. Furthermore, the skill attribute if extracted from the resume may carry greater weight as opposed to the skill attribute extracted from the job seeker's social media profile.

The attributes are aggregated at 710 into a data structure such as the first aggregated attribute data structure 136. Generating a single data structure to store the various attributes simplifies the process of analyzing informational items provided by different data sources in different formats. All the information regarding the first element 132 can be accessed through the first aggregated attribute data structure 136. In the interests of brevity, the generation of a plurality of second aggregated attribute data structures 176 is not discussed herein. However, it can be appreciated that informational items for each of the plurality of second elements 172 can also be extracted from the plurality of data sources 150 and processed in a manner as discussed above for the extraction of attributes related to the plurality of second elements 172 and for the generation of corresponding second aggregated attribute data structures that enable determining the extent of the match of the plurality of second elements 172 with the first element 132.

At 712, the pairs of attributes are generated. Each pair of attributes includes an attribute of the first element 132 and an attribute of one of the plurality of second elements 172. In an example, attribute pairs mapping each of the attributes of the first element 132 with each attribute of each of the plurality of second elements 172 can be generated. However, generating and processing such a large number of attribute pairs can lead to computational complexities and the creation of noisy pairs which may not help in determining the matches. Hence, the data matching system 100 can be configured to generate specific pairs of attributes. By way of illustration and not limitation, pairs of attributes wherein the attributes each have similar attribute type can be generated. For example, the raw attributes of the first element 132 can be paired with the raw attributes of each of the plurality of second elements 172. Similarly, other attribute pairs can be predetermined and generated at 712. At 714, the total weight of each attribute pair is determined based on the weights of the individual attributes that make up the pair.

Pairwise rankings are obtained at 716 for the plurality of second elements. The pairwise rankings can be obtained based on the corresponding total weights. Referring again to the recruitment example discussed herein, attribute pairs that include attributes of one or more of the plurality of second elements 172 that are paired with the location attribute of the first element 132 can be scored and ranked based on the total weights of the attribute pairs. The top n (wherein n is a natural number) second elements are obtained in terms of the match with the first element under the location attribute. Similarly, the pairwise rankings of each second element under each attribute of the first set of attributes 134 are generated and the top n second elements for each attribute of the first set of attributes 134 are identified. The ranks of each second element of the top n second elements are aggregated across the attributes at 718 to obtain an aggregated rank of that second element. For example, the aggregated rank of a job opportunity is obtained by aggregating the ranks of that job opportunity across the location, skills, experience, industry, etc., attributes. The aggregated ranks of the top n second elements are compared and the top k second elements (wherein k is a natural number and k≤n) which appear on the maximum number of pairwise ranking lists are identified at 720 by counting the number of attributes under which a given second element may appear in the top n ranks. In an example, the top k elements can be provided at 722 as the ranked list 178 of second elements that are the closest matches or most relevant to the first element 132 as determined in accordance with the examples disclosed herein.

At 724, user feedback to the ranked list 178 is collected. In an example, the user feedback can include the modified ranked list 522 wherein the top k elements may be the same or different from the second elements provided in the ranked list 178. Therefore, a dissimilarity metric is calculated at 726 between the ranked list and the modified ranked list. In an example, the dissimilarity metric can be obtained by using rank correlation metrics like Kendall's Tau. For example:

$$\text{Error}=\text{DissMetric}(R1,R2) \qquad \text{Eq. (3)}$$

wherein R1 and R2 are the ranked list 178 and the modified ranked list 522.

Based on the dissimilarity metric, the weights of the different attributes are adjusted at 728. Therefore, the data matching system 100 can be configured to automatically be adjusted to changes in the domain and user preferences.

Figure 7B:
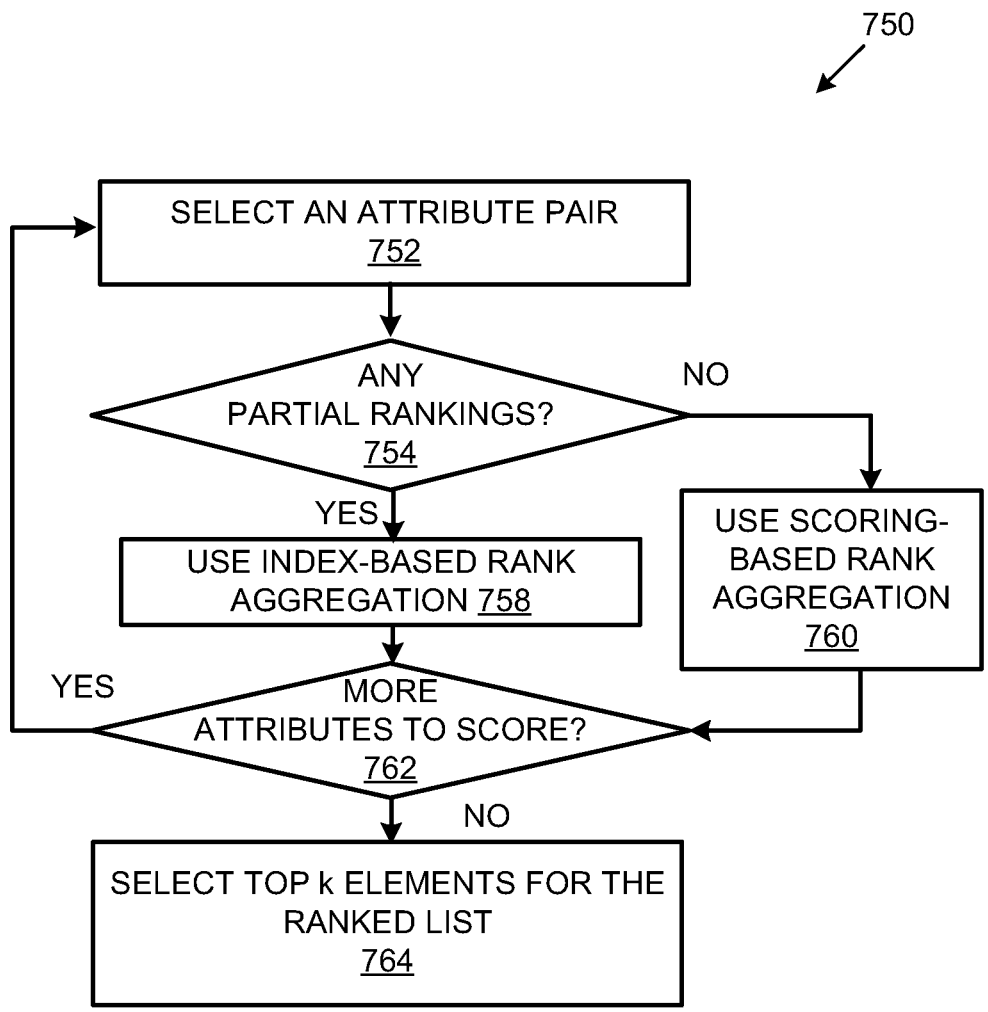
FIG. 7B shows a flowchart that details a method of aggregating the pairwise rankings in accordance with the examples disclosed herein.

FIG. 7B shows a flowchart 750 that details a method of aggregating the pairwise rankings in accordance with the examples disclosed herein. Accordingly, an attribute of the first element is selected at 752. It is determined at 754 if any of the attribute pairs of the second element that are paired with the selected attribute correspond to partial ranking. If it is determined at 754 if any of the attribute pairs pertaining to that attribute include partial rankings, then the attribute pairs can be scored/ranked at 758 using index-based rank aggregation such as Kemeny Young Rank Aggregation, etc. The index-based aggregation can include calculating a rank correlation coefficient and applying an optimization algorithm. The rank correlation coefficient can be calculated using Kendall's Tau, Spearman's Rho, etc. The optimization algorithm can include the Genetic Algorithm, Cross-Entropy Monte Carlo solvers, LP solvers, etc. If it is determined at 754 that the attribute pairs do not include any partial rankings then the attribute pairs can be ranked at 760 using score-based rank aggregation wherein Fagin's algorithm can be used to obtain the aggregated rank. Fagin gives an algorithm for efficiently merging multiple ordered streams of ranked results, to form a new stream ordered by a combination of those ranks. In an example:

$$\text{Aggregation Function}=\Sigma(\text{Totalweight}\times\text{Score}) \qquad \text{Eq. (2)}$$

At 762 it is determined if further attributes remain to be scored. If yes, the method returns to 752 to repeat the processing described above. If at 762 it is determined that no further attributes remain for processing, the top n elements for each of the attributes e obtained wherein n is a natural number and n>k. The top n elements for each of the attributes can be compared at 764 to determine at least k elements that appear on a maximum number of the lists or on all the lists of all the attributes that were scored.

It can be appreciated that the serial processing of the attribute pairs for the aggregation of pairwise ranking is shown herein for illustration purposes and that the ranks of attribute pairs can be aggregated simultaneously in parallel for the plurality of second elements.

Figure 8:
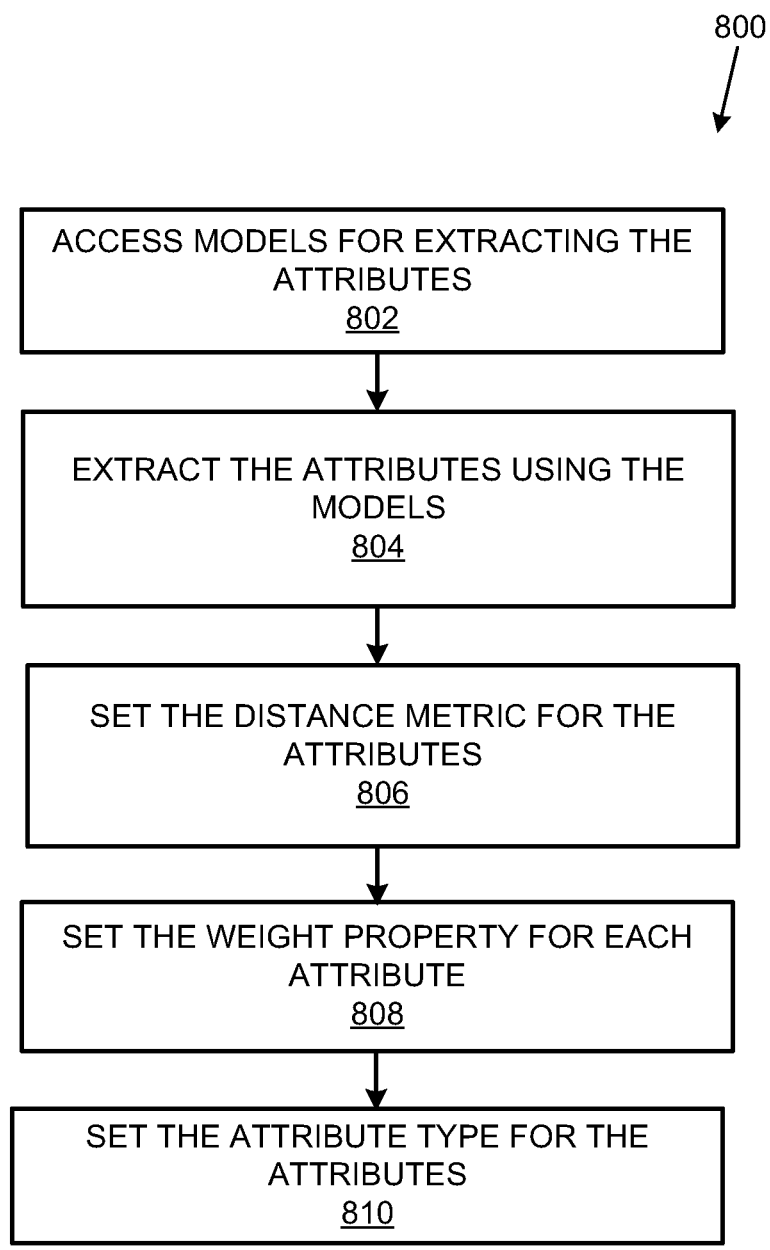
FIG. 8 shows a flowchart that details a method of extracting the attributes in accordance with the examples disclosed herein.

FIG. 8 shows a flowchart 800 that details a method of extracting the attributes in accordance with the examples disclosed herein. The method begins at 802 wherein the different models for extracting the various attributes are accessed from the knowledge platform 180. In an example, the models can be accessed based on a domain/sub-domain input. For example, if a job seeker is searching for open positions in certain areas such as financial, retail, etc., then the models pertaining to the retail/financial sub-domains of the recruitment domain are accessed at 802. At 804, the first dataset 130 is processed using the models accessed at 802 to extract the attributes. At 806, the distance metric property is set for each of the attributes. For textual attributes such as raw attributes, the distance metric an be set to Cosine similarity. For other attribute types such as complex attributes, other distance metrics such as Manhattan metric or Haversine metric is set. At 808, the weight property is set for each of the attributes. As mentioned above, the weight of each attribute can be calculated as a combination of the weight associated with a data source from which the attribute was obtained and the weight associated with that attribute. Additionally, the attribute type property is set at 810 based on the type of data used to store the information associated with the attribute. Different data types such as but not limited to a string, a float, an integer, a Boolean value, etc., can be used to set the attribute type property of the attributes.

Figure 9:
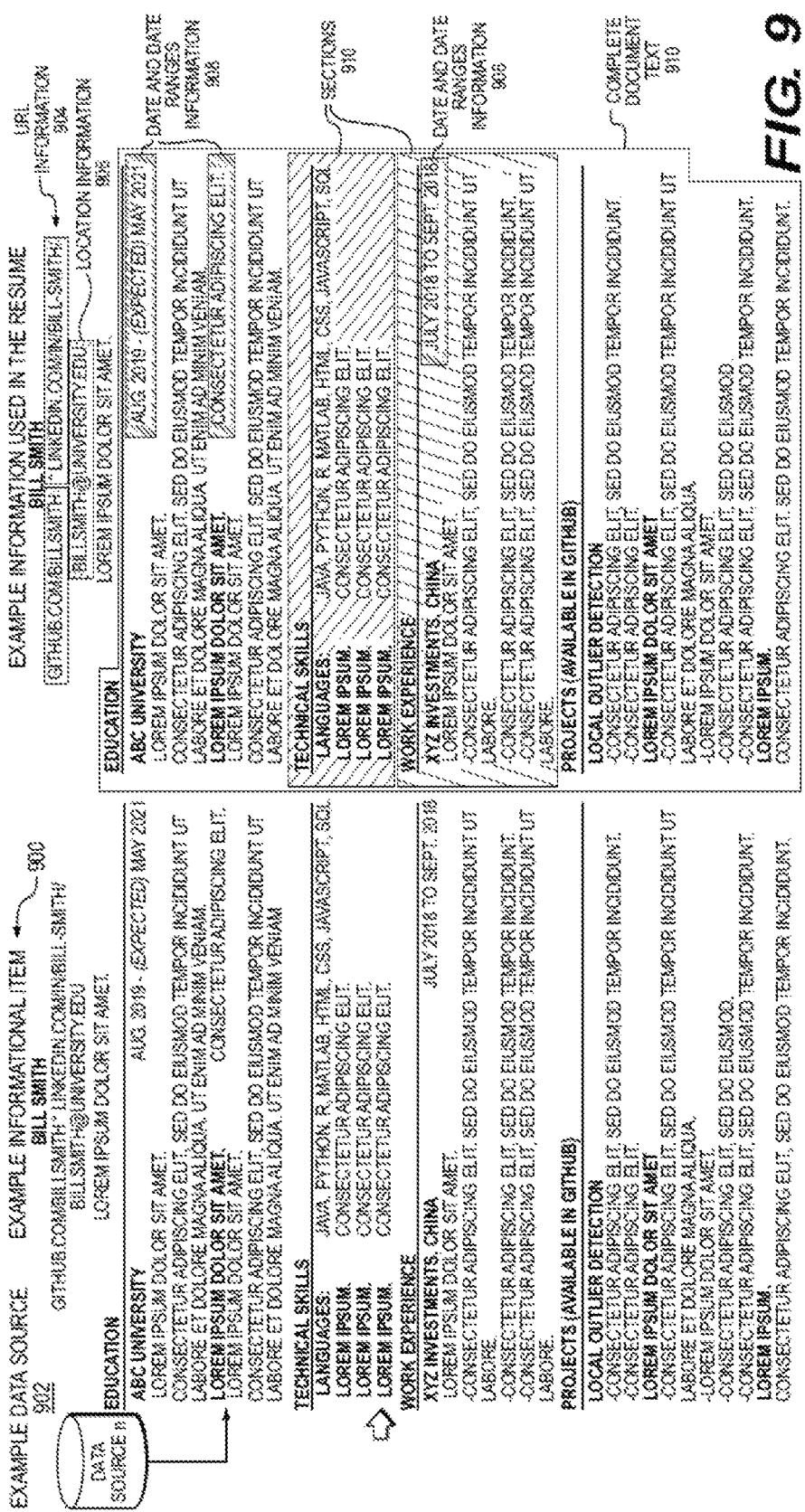
FIG. 9 shows an example informational item for extracting attributes in accordance with the examples disclosed herein.

FIG. 9 shows an example informational item 900 from which the attributes can be extracted in accordance with the examples disclosed herein. The example informational item 900 includes a resume of a candidate for employment. The example informational item 900 is obtained from an example data source 902 and includes many data elements that are extracted as attributes of an element (in this case the element is the candidate). For example, the Universal Resource Locator (URL) information 904 from the resume can be used to generate context augmentation or IE-based attributes 288. The location information 906 can be used to generate latitude/longitude or complex attributes 200. The Date and date range 908 can be used to build the years of experience which are extracted by the rule-based extractor 204 as rule-based attributes 244. The sections 910 extracted from the resume are used to build the section segmentation attributes such as skill section, work-experience section, etc., by the IE-based extractor 208 as IE-based attributes 288. The complete document text 912 can be used for extracting complex attributes 200 such as industry classification, experience level classification, etc.

FIG. 10 shows an example table 1000 including certain examples of different attribute inference types that can be extracted for the recruitment domain. It can be appreciated that the attributes table 1000 shows only certain examples and that other attributes not included in the attributes table 1000 may also be extracted in accordance with other examples as indicated by the ellipsis at the bottom of the table 1000. The table 1000 includes the attribute type 1050, the attribute name 1052, the distance metric 1054, the type 1056, and the weight 1058. The raw attribute type 1002 can include a complete document such as a resume with the distance metric set to Cosine Similarity, the attribute type set to a string, and a weight. The rule-based attribute type 1004 can include Years of experience with the distance metric set to Manhattan and the type set to Float. The IE-based attributes 288 can include the education section, the work experience body, and the skills body with the distance metric set to cosine similarity and type string. The classification-based attributes 266 can include Level and Industry with the distance metric set to Manhattan and type set to string. The complex attributes 200 can include Location and Personality attributes. The location attribute has the distance metric set to Haversine metric while the type is set to float while the Personality attributes are similar to the location attribute except that the distance metric of the Personality attributes is set to Manhattan. While the table 1000 shows certain examples of a distance metric and data type for each type of inference, different distance metrics and data types can be associated with rule based attributes apart from Manhatten and float. For example, a rule-based inference can also have a string data type, FIG. 11 illustrates a computer system 1100 that may be used to implement the data matching system 100. More particularly, computing machines such as desktops, laptops, smartphones, tablets, and wearables which may be used to generate or access the data from the data matching system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be non-transitory or non-volatile medium, such as a magnetic disk or solid-state non-volatile memory or volatile medium such as RAM. The instructions or modules stored on the processor-readable medium 1106 may include machine-readable instructions 1164 executed by the processor(s) 1102 that cause the processor(s) 1102 to perform the methods and functions of the data matching system 100.

The data matching system 100 may be implemented as software stored on a non-transitory processor-readable medium and executed by the one or more processors 1102. For example, the processor-readable medium 1106 may store an operating system 1162, such as MAC OS, MS WINDOWS, UNIX, or LINUX, and code 1164 for the data matching system 100. The operating system 1162 may be multi-user, multiprocessing, multitasking, multithreading, real-time, and the like. For example, during runtime, the operating system 1162 is running and the code for the attribute-based data matching system 100 is executed by the processor(s) 1102.

The computer system 1100 may include a data storage 1110, which may include non-volatile data storage. The data storage 1110 stores any data used by the data matching system 100. The data storage 1110 may be used to store the datasets pertaining to different elements being matched, the attribute aggregated data, structures, etc., and other data that is used or generated by the data matching system 100 during the course of operation.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An attribute-based data matching system, comprising:
at least one processor;
a non-transitory processor readable medium storing machine-readable instructions that cause the processor to:
access a first dataset relating to a first element that is to be matched a plurality of second elements, wherein the first dataset includes data items obtained from a plurality of data sources;
extract, a first set of attributes associated with the first dataset, wherein each of the first set of attributes has associated at least a distance metric, a weight property and an attribute type;
aggregate the first set of attributes into a first aggregated attribute data structure;
generate pairs of attributes, wherein each attribute pair includes an attribute from the first aggregated attribute data structure and an attribute from at least a second aggregated attribute data structure that aggregates a second set of attributes corresponding to one of the plurality of second elements;
obtain pairwise rankings of each of the plurality of second elements for each attribute in the first set of attributes;
select top n second elements for each attribute of the first set of attributes for further processing based on the pairwise rankings, wherein n is a natural number;
generate aggregated ranks for the top n second elements by aggregating the pairwise rankings of the top n second elements, wherein for each of the top n second elements, a score-based aggregation is used to obtain the aggregated rank of a second element of the top n second elements when a partial rank is detected within the attribute pairs and an index-based aggregation is used to obtain the aggregated rank of the second element where no partial rank is detected for at least one of the attribute pairs of the second element; and provide a ranked list of a top k second elements based on the aggregated ranks of the top n second elements, wherein k is a natural number and k is less than or equal to n and the aggregated rank is indicative of an extent match between the second element and the first element.

2. The attribute-based data matching system of claim 1, wherein the processor is to further:

modify the ranked list based on a dissimilarity metric that identifies mismatches between the aggregated ranks in the ranked list and corresponding ground truth values for the top k second elements provided in user feedback.

3. The attribute-based data matching system of claim 1, wherein to access a first dataset the processor is to further:

access a plurality of data sources including one or more documents of different data formats;

convert the one or more documents into a standard format; and generate the first dataset by parsing and tokenizing the one or more documents converted into the standard format.

4. The attribute-based data matching system of claim 1, wherein the processor is to further:

set the weight property of each attribute of the first set of attributes to a product of a weight associated with a data source of the plurality of data sources from which a data item corresponding to the attribute is extracted and a weight associated with the attribute.

5. The attribute-based data matching system of claim 1, wherein to extract the first set of attributes the processor is to further:

extract, raw text of the data items as one or more raw text attributes for the first set of attributes wherein the distance metric of the one or more raw text attributes includes one of cosine similarity or Levenshtein Distance and the attribute type is set to string.

6. The attribute-based data matching system of claim 1, wherein to extract the first set of attributes the processor is to further:

extract one or more rule-based attributes for the first set of attributes, wherein the one or more rule-based attributes are extracted via application of one or more rules to the data items and wherein the distance metric of the one or more rule-based attributes includes Manhattan distance metric and the attribute type of the one or more rule-based attributes is set to float.

7. The attribute-based data matching system of claim 1, wherein to extract the first set of attributes the processor is to further:

extract one or more classification-based attributes for the first set of attributes, wherein the one or more classification-based attributes are extracted via application of one or more machine learning (ML) classification models to the first dataset and wherein the distance metric of the classification-based attributes includes one of Euclidean distance metric, Manhattan distance metric, Cosine similarity metric and Haversine distance metric and the attribute type of the one or more classification-based attributes is set to one of an integer or a string.

8. The attribute-based data matching system of claim 1, wherein to extract the first set of attributes the processor is to further:

extract one or more complex attributes for the first set of attributes, wherein the one or more complex attributes are extracted via application of one or more trained information extraction (IE) models to the first dataset and wherein the distance metric of the one or more complex attributes includes Manhattan distance metric and the attribute type of the one or more complex attributes is set to float.

9. The attribute-based data matching system of claim 1, wherein to aggregate the first set of attributes the processor is to further:

generate the first aggregated attribute data structure by concatenating the first set of attributes.

10. The attribute-based data matching system of claim 1, Wherein the first aggregated attribute data structure includes a hash map.

11. The attribute-based data matching system of claim 1, wherein to generate the pairs of attributes the processor is to further:

map the attributes from the first aggregated attribute data structure to second aggregated attribute data structures associated with the plurality of second elements based on predetermined mappings.

12. The attribute-based data matching system of claim 1, wherein to obtain the pairwise rankings of the plurality of second elements, the processor is to further:

obtain a total weight of each of the attribute pairs as a product of individual weight properties of each of the attributes in the attribute pair; and determine the pairwise ranking of each second element of the plurality of second elements based on corresponding total weights of the attribute pairs associated with the second element.

13. The attribute-based data matching system of claim 1, to obtain the aggregated rank using the score-based aggregation the processor is to further:

employ one of Fagins algorithm, Bayesian Rank aggregator, Threshold algorithm to aggregate the pairwise rankings of the top n second elements.

14. The attribute-based data matching system of claim 13, wherein to obtain the aggregated rank using the index-based aggregation the processor is to further:

calculate rank correlation coefficient for the top n second elements; and apply an optimization algorithm for obtaining the aggregated rank.

15. The attribute-based data matching system of claim 1, wherein the first element corresponds to a job seeker and the plurality of second elements correspond to job opportunities.

16. The attribute-based data matching system of claim 1, wherein the first element corresponds to a job opportunity and the plurality of second elements correspond to candidates for the job opportunity.

17. A method comprising:

accessing a first dataset relating to a first element that is to be matched a plurality of second elements, wherein the first dataset includes data items obtained from a plurality of data sources;

extracting a first set of attributes associated with the first dataset wherein each of the first set of attributes has associated at least a distance metric, a weight property and an attribute type;

aggregating the first set of attributes into a first aggregated attribute data structure;

generating pairs of attributes, wherein each attribute pair includes an attribute from the first aggregated attribute data structure and an attribute from at least a second aggregated attribute data structure that aggregates a second set of attributes corresponding to one of the plurality of second elements:

obtaining pairwise rankings of each of the plurality of second elements for each attribute in the first set of attributes:

selecting top n second elements for each attribute of the first set of attributes for further processing based on the pairwise rankings, wherein n is a natural number:

generating aggregated ranks for the top n second elements by aggregating the pairwise rankings of the top n second elements, wherein for each of the top n second elements a score-based aggregation is used to obtain the aggregated rank of a second element of the top n second elements when a partial rank is detected within the attribute pairs and an index-based aggregation is used to obtain the aggregated rank of the second element where no partial rank is detected for at least one of the attribute pairs of the second element, and providing a ranked list of a top k second elements based on the aggregated ranks of the top n second elements, wherein k is a natural number and k is less than or equal to n and the aggregated rank is indicative of an extent match between the second element and the first element.

18. The method of claim 17, further comprising:

modifying the ranked list based on a dissimilarity metric that identifies mismatches between the aggregated ranks of the top k second elements in the ranked list and corresponding ground truth values provided in user feedback.

19. A non-transitory processor-readable storage medium comprising machine-readable instructions that cause a processor to:

access a first dataset relating to a first element that is to be matched a plurality of second elements, wherein the first dataset includes data items obtained from a plurality of data sources;

extract a first set of attributes associated with the first dataset, wherein each of the first set of attributes has associated at least a distance metric, a weight property and an attribute type;

aggregate the first set of attributes into a first aggregated attribute data structure;

generate pairs of attributes, Wherein each attribute pair includes an attribute from the first aggregated attribute data structure and an attribute from at least a second aggregated attribute data structure that aggregates a second set of attributes corresponding to one of the plurality of second elements;

obtain pair wise rankings of each of the plurality of second elements for each attribute in the first set of attributes;

select top n second elements for each attribute of the first set of attributes for further processing based on the pairwise rankings, wherein n is a natural number;

generate aggregated ranks for the top a second elements by aggregating the pairwise rankings of the top n second elements, wherein for each of the top n second elements, a score-based aggregation is used to obtain the aggregated rank of a second element of the top n second elements when a partial rank is detected within the attribute pairs and an index-based aggregation is used to obtain the aggregated rank of the second element where no partial rank is detected for at least one of the attribute pairs of the second element; and provide a ranked list of a top k second elements based on the aggregated ranks of the top n second elements, wherein k is a natural number and k is less than or equal to n and the aggregated rank is indicative of an extent match between the second element and the first element.

20. The non-transitory processor-readable storage medium of claim 19, further comprising instructions that cause the processor to:

record the partial rank when one of the attributes in an attribute pair is missing.

* * * * *

UNITED STATES PATENT AND TRADEMARK OFFICE
CERTIFICATE OF CORRECTION

PATENT NO. : 11,494,441 B2
APPLICATION NO. : 16/984984
DATED : November 8, 2022
INVENTOR(S) : Ditty Mathew et al.

It is certified that error appears in the above-identified patent and that said Letters Patent is hereby corrected as shown below:

In the Claims

At Claim 1, Column 14, Line 43 from the top, the phrase "extract, a first" should instead read "extract a first".

At Claim 5, Column 15, Line 35 from the top, the phrase "extract, raw test" should instead read "extract raw test".

At Claim 10, Column 16, Line 14 from the top, the phrase "Wherein the first" should instead read "wherein the first".

At Claim 17, Column 17, Line 2 from the top, the phrase "second elements:" should instead read "second elements;".

At Claim 17, Column 17, Line 5 from the top, the phrase "set of attributes:" should instead read "set of attributes;".

At Claim 17, Column 17, Line 8 from the top, the phrase "natural number:" should instead read "natural number;".

At Claim 17, Column 17, Line 12 from the top, the phrase "elements a score-based" should instead read "elements, a score-based".

At Claim 17, Column 17, Line 18 from the top, the phrase "element, and" should instead read "element; and".

At Claim 19, Column 18, Line 7 from the top, the phrase "attributes, Wherein" should instead read "attributes, wherein".

Signed and Sealed this
Fourteenth Day of November, 2023

Katherine Kelly Vidal
*Director of the United States Patent and Trademark Office*

At Claim 19, Column 18, Line 13 from the top, the phrase "obtain pair wise" should instead read "obtain pairwise".

At Claim 19, Column 18, Line 19 from the top, the phrase "top a second" should instead read "top n second".